United States Patent
Oikawa et al.

(10) Patent No.: US 7,205,020 B2
(45) Date of Patent: Apr. 17, 2007

(54) MAGNETIC RECORDING MEDIUM AND METHOD FOR MANUFACTURING SAME

(75) Inventors: Tadaaki Oikawa, Nagano (JP); Hiroyuki Uwazumi, Nagano (JP); Takahiro Shimizu, Nagano (JP); Naoki Takizawa, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 191 days.

(21) Appl. No.: 10/757,901

(22) Filed: Jan. 14, 2004

(65) Prior Publication Data

US 2004/0151949 A1 Aug. 5, 2004

Related U.S. Application Data

(63) Continuation of application No. 10/008,743, filed on Nov. 8, 2001, now abandoned.

(30) Foreign Application Priority Data

Nov. 9, 2000 (JP) .............................. 2000-342485
Jan. 9, 2001 (JP) .............................. 2001-001928

(51) Int. Cl.
*B05D 5/12* (2006.01)
(52) U.S. Cl. .................. 427/127; 427/128; 427/130; 427/132; 428/629; 428/632; 428/668; 428/669
(58) Field of Classification Search ............. 427/127, 427/128, 130, 121, 132; 428/629, 632, 668, 428/669
See application file for complete search history.

(56) References Cited

U.S. PATENT DOCUMENTS

| 4,557,944 | A  | * | 12/1985 | Arai et al. ................... 427/537 |
| 5,679,473 | A  |   | 10/1997 | Murayama et al. |
| 5,774,783 | A  |   | 6/1998  | Kaitsu et al. |
| 6,477,118 | B1 | * | 11/2002 | Awano et al. ............ 369/13.14 |
| 6,558,811 | B1 | * | 5/2003  | Wong ......................... 428/611 |
| 6,743,503 | B1 | * | 6/2004  | Chen .......................... 428/336 |
| 2002/0136926 | A1 | | 9/2002 | Oikawa et al. |

FOREIGN PATENT DOCUMENTS

EP 0 540 058 A2 5/1993

\* cited by examiner

*Primary Examiner*—Alain L. Bashore
(74) *Attorney, Agent, or Firm*—Darby & Darby

(57) ABSTRACT

A magnetic recording medium has a non-magnetic underlayer, a magnetic layer, a protective film and a liquid lubricant layer sequentially laminated on a non-magnetic substrate. The magnetic layer has a multi-layer structure laminated with two or more magnetic layer components, each of the magnetic layer components having ferromagnetic grains and non-magnetic grain boundaries surrounding the grain. The resulting magnetic recording medium has a granular magnetic layer exhibiting very high Hc accompanying high density of magnetic recording, while decreasing the amount of platinum needed for attaining the high Hc, and reducing media noise accompanying the high recording density.

3 Claims, 2 Drawing Sheets

MAGNETIC RECORDING MEDIUM AND METHOD FOR MANUFACTURING SAME

CROSS-REFERENCE TO RELATED APPLICATION

This application is a continuation application of U.S. patent application Ser. No. 10/008,743, filed Nov. 8, 2001, now abandoned and which is hereby incorporated by reference in its entirety.

TECHNICAL FIELD OF THE INVENTION

The present invention relates to a magnetic recording medium mounted on magnetic recording devices, such as an external memory device of a computer. The present invention further relates to a method for manufacturing such a recording medium.

BACKGROUND OF THE INVENTION

In recent years there has been a requirement for a magnetic recording medium with higher recording density and lower noise. Various conventional compositions and structures of a magnetic layer and materials for a non-magnetic under-layer and a seed layer have been proposed. In particular, a magnetic layer called the granular magnetic layer has been proposed having a structure in which a ferromagnetic grain is surrounded by non-magnetic non-metallic substance, such as oxide or nitride.

Japanese Unexamined Patent Application Publication No. H8-255342, for example, discloses attaining low noise by forming a granular recording layer in which ferromagnetic grains are dispersed in a non-magnetic film. This is accomplished by a method comprising steps of sequentially depositing a non-magnetic film, a ferromagnetic film and a non-magnetic film on a non-magnetic substrate, and heat-treating the laminate. For this type of conventional magnetic layer, cobalt or an alloy containing cobalt as a main component is used. A metal, oxide, nitride, carbon or carbide is used for the non-magnetic film.

U.S. Pat. No. 5,679,473 discloses that a granular recording film, in which each magnetic grain is surrounded by a non-magnetic oxide and separated with each other, can be formed by means of RF (radio frequency) sputtering using a CoNiPt target added with an oxide, such as $SiO_2$. Low noise is achieved by such a conventional recording film.

The low noise achieved in the above recording film is considered to be achieved by the following reason. Since each of the magnetic grains in this granular magnetic film is physically separated by a grain boundary of non-magnetic non-metallic phase, magnetic interaction between the magnetic grains is reduced and formation of the magnetic domain wall with a zigzag shape at the transition region of a recording bit is suppressed.

Noises of a recording medium are caused by fluctuation of magnetization due to magnetic interaction between magnetic grains that constitute the medium, and the size of the grain. In order to maintain high SNR keeping up with enhancement of the recording density, it is necessary to hold the number of magnetic grains per bit cell greater than a certain value. In other words, minimization of the size of the magnetic grain is required. However, in the situation where large exchange interaction arises between the magnetic grains, the minimization of magnetic grains frequently does not necessarily mean minimization of unit of reversed magnetization. Therefore, it is also necessary to suppress the exchange interaction between the grains for minimizing the unit of reversed magnetization itself that is represented by an activation magnetic moment. Further in the minimization, the magnetic grain itself must have a relatively large value of energy of magnetic anisotropy so that a superparamagnetic state does not occur and the magnetic characteristic essential for high resolution recording, that is, a large Hc/Mrt value, can be obtained. The objective aimed at by the granular structure, in which magnetic grains having high energy of magnetic anisotropy are dispersed in a non-magnetic matrix, is that the above-described rigorous requirements are met for attaining high SNR.

In the conventionally used Co—Cr alloy magnetic film, chromium is segregated from a cobalt alloy magnetic grain towards a grain boundary, so as to reduce magnetic interaction between the magnetic grains. On the other hand, in the granular magnetic layer, the grain boundary phase is composed of a non-magnetic non-metallic substance, which segregates easier than the conventional chromium. Consequently, isolation of magnetic grains is easily enhanced. In the conventional Co—Cr alloy magnetic layer, heating the substrate up to 200° C. is essential for sufficient segregation of chromium when laminating the layer. The granular magnetic layer has the advantage that the non-magnetic non-metallic substance segregates even in lamination without heating.

However, a magnetic recording medium having a granular magnetic film requires addition of relatively large amount of platinum to the cobalt alloy to attain desired magnetic characteristic, in particular, high coercive force Hc. To achieve a coercive force of 2,800 Oe in a granular magnetic film, as high as 16 at % of platinum is commonly needed, while in the conventional CoCr alloy magnetic film, only 8 at % of platinum is required for obtaining the same value of the coercive force Hc. With the growing density of magnetic recording in recent years, very high coercive force of higher than 3,200 Oe is becoming necessary. As a result, the granular magnetic film that requires large amount of expensive platinum has brought about a problem of rising of manufacturing cost. In addition, more reduction of the media noise is demanded accompanying with enhancement of the recording density.

Moreover, with respect to crystal growth at a low thickness stage, that is an initial growth stage, the granular magnetic layer is disordered and a clear granular structure is not formed. This situation is the main cause of deterioration in magnetic characteristics and electromagnetic conversion characteristics in the low Br δ region, Br δ being a product of remanent magnetic flux density and film thickness. In the future trend for the magnetic layer to become thinner, accompanied by a higher recording density, this deterioration of the magnetic characteristics and the electromagnetic conversion characteristics at the initial growth stage of the granular magnetic layer are difficult problems to solve.

Although the non-magnetic non-metallic substance in the granular magnetic layer on a substrate segregates even in unheated lamination, in-plane orientation of magnetization in the magnetic layer is difficult to attain. An isotropic or random orientation medium is liable to be formed.

OBJECTS AND SUMMARY OF THE INVENTION

It is an object of the present invention to provide a magnetic recording medium which overcomes the foregoing problems.

It is another object of the present invention to provide a magnetic recording medium having a granular magnetic layer that exhibits very high Hc accompanying high density of magnetic recording, while decreasing the amount of platinum which is needed for attaining the high Hc, and reducing media noise accompanying the high recording density.

It is a further object of the present invention to provide a method for manufacturing a magnetic recording medium which overcomes the foregoing problems.

The inventors of the present invention have made rigorous studies for effectively giving desired alignment to the granular magnetic layer and for achieving high Hc, low noise, and low cost in the granular magnetic film. The inventors have found that, in order to obtain desired alignment in the magnetic layer, alignment in the layer below the magnetic layer has to be controlled and the magnetic layer needs to epitaxially grow on this controlled layer. It is further revealed that definitely higher Hc and lower noise can be achieved, as compared to conventional magnetic recording medium that has a continuously deposited magnetic layer, that is, a magnetic layer composed of a single magnetic layer component, when a process for laminating the magnetic layer is divided into a plurality of steps and the magnetic layer is formed with a plurality of magnetic layer components.

Advantageously, oxide layers are provided on and beneath each of the magnetic layer components in the multi-layered magnetic layer.

Specifically, the present invention provides two types of magnetic recording media, depending on the structure of a magnetic layer of the medium. The first magnetic recording medium of the present invention comprises a non-magnetic under-layer, a magnetic layer, a protective film and a liquid lubricant layer sequentially laminated on a non-magnetic substrate. The magnetic layer has a multi-layered structure being laminated with two or more magnetic layer components, each of which consists of ferromagnetic grains and non-magnetic grain boundaries surrounding the grain.

Advantageously, the composition of the magnetic layer components in the magnetic layer is different from one another.

The second magnetic recording medium of the invention comprises a non-magnetic under-layer, a magnetic layer, a protective film, and a liquid lubricant layer sequentially laminated on a non-magnetic substrate. The magnetic layer comprises two or more magnetic layer components and three or more oxide layers, each of the magnetic layer components consists of ferromagnetic grains and non-magnetic grain boundaries surrounding the grains. The magnetic layer components and the oxide layers are alternately laminated such that the top layer and the bottom layer of the magnetic layer are oxide layers.

Advantageously, the non-magnetic grain boundary in the magnetic layer components in the first and second magnetic recording media is composed of oxide or nitride of at least one element selected from the group consisting of Cr, Co, Si, Al, Ti, Ta, Hf and Zr.

Advantageously, the non-magnetic under-layer of the above-described magnetic recording medium is composed of chromium or chromium alloy. The non-magnetic substrate may be made preferably of crystallized glass, chemically strengthened glass or plastic.

A method for manufacturing the above-described first magnetic recording medium of the invention the following steps:

(1) laminating a non-magnetic under-layer on a non-magnetic substrate,
(2) laminating a magnetic layer on the under-layer by depositing a plurality of magnetic layer components, each of the components comprising ferromagnetic grains and grain boundaries surrounding the grains,
(3) laminating the protective film on the magnetic layer, and
(4) laminating the liquid lubricant layer on the protective layer.

Advantageously, the step for laminating the magnetic layer is a step for depositing a plurality of magnetic layer components each having a composition different from that of the other components.

A method for manufacturing the second magnetic recording medium of the invention comprises the following steps:

(1) laminating a non-magnetic under-layer on a non-magnetic substrate,
(2) laminating a magnetic layer on the under-layer by
    (i) exposing to an atmosphere of oxygen-containing gas and forming an oxide layer on the surface exposed to oxygen,
    (ii) depositing a magnetic layer component comprising ferromagnetic grains and grain boundaries surrounding the grains,
    (iii) repeating the procedures (i) and (ii) desired times, and
    (iv) exposing to an atmosphere of oxygen-containing gas and forming an oxide layer on the surface exposed to oxygen,
(3) laminating a protective film on the magnetic layer, and
(4) laminating a liquid lubricant layer on the protective layer.

The above-described method for manufacturing a magnetic recording medium according to the invention allows performance of steps (1) to (4) without heating the non-magnetic substrate in advance.

The above, and other objects, features and advantages of the present invention will become apparent from the following description read in conjunction with the accompanying drawings, in which like reference numerals designate the same elements.

DETAILED DESCRIPTION OF THE INVENTION

Now, aspects of some preferred embodiments of the invention will be described referring to FIG. 1, FIGS. 2(a) and FIG. 2(b).

Figure 1:
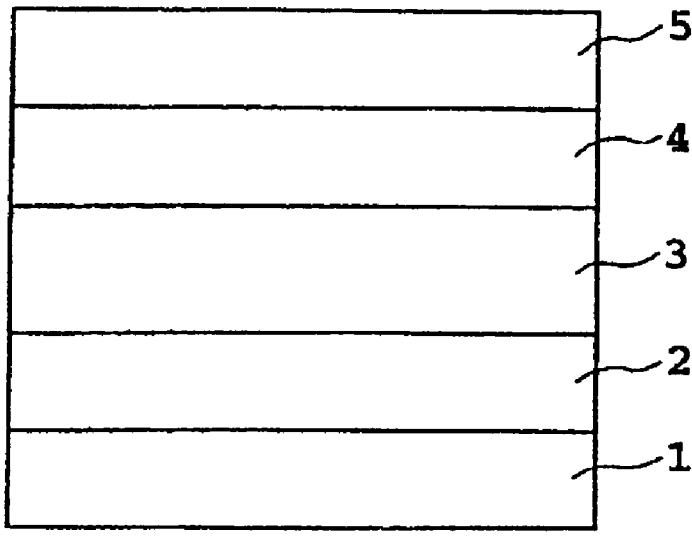
FIG. 1 is a schematic cross-sectional view of an example of a magnetic recording medium according to the present invention.

The magnetic recording medium of FIG. 1 has a structure in which a non-magnetic under-layer 2a, magnetic layer 3 and a protective film 4 are sequentially formed on a non-magnetic substrate 1. A liquid lubricant layer 5 is formed on the laminate. The magnetic layer shown in FIG. 2(a) has a three-layer structure in which magnetic layer components 3a, 3b and 3c are laminated. The magnetic layer shown in FIG. 2(b) has a laminate structure in which each of magnetic layer components 3a, 3b and 3c is sandwiched by two of the oxide layers 3a', 3b', 3c' and 3d'. The resulting laminate is layered in the sequence 3a', 3a, 3b', 3b, 3c', 3c and 3d'.

The first magnetic recording medium of the present invention will be described first.

Non-magnetic substrate 1 may be made of NiP-plated aluminum alloy, strengthened glass or crystallized glass as in the conventional magnetic recording medium. In addition, a substrate made by injection molding polycarbonate, polyolefin or other resins may also be used since heating the substrate is not required by the production process of the invention.

Non-magnetic under-layer 2 is formed on non-magnetic substrate 1 by any conventional means, such as electron-beam evaporation or sputtering. Non-magnetic under-layer 2 is composed of non-magnetic substance including NiAl and Cr. Chromium or chromium alloy is preferably used for under-layer 2. Preferable chromium alloys include CrMo, CrTi, CrV and CrW. The thickness of non-magnetic under-layer 2 is preferably in the range from 5 nm to 50 nm for obtaining optimum magnetic characteristics and an electro-magnetic conversion characteristic.

Magnetic layer 3 is formed on non-magnetic under-layer 2. The structure of magnetic layer 3 of a first magnetic recording medium is a multi-layer structure composed of a plurality of magnetic layer components 3a, 3b and 3c that are laminated by a magnetic layer deposition process divided into a plurality of steps. Each of magnetic layer component 3a, 3b and 3c is a so-called granular magnetic layer that comprises ferromagnetic grains and non-magnetic grain boundaries surrounding the grains. The non-magnetic grain boundary are composed of oxide or nitride of metals and silicon. Such structure of magnetic layer components 3a, 3b and 3c may be obtained, for example, by deposition employing sputtering method using a target of ferromagnetic metal containing oxide that composes the non-magnetic grain boundary. Alternatively, magnetic layer components 3a, 3b and 3c, having granular structure, may be obtained by deposition employing reactive sputtering in oxygen-containing argon gas using a target of ferromagnetic metal.

As material for composing the ferromagnetic grains, CoPt alloy is used preferably. Specifically, a CoPt alloy added with at least an element selected from the group consisting of chromium, nickel and tantalum is favorable for reducing media noise. As material for composing the non-magnetic grain boundaries, an oxide or a nitride of at least one element selected from the group consisting of Cr, Co, Si, Al, Ti, Ta, Hf and Zr is particularly favorable for forming a stable granular structure.

Thickness of magnetic layer 3, having a multi-layer structure, is necessary to be such a value that provides enough head reproduction output when reproducing a record. The total thickness is desirable to be nearly equal to the thickness needed by a conventional one-layered continuous film.

Though the magnetic layer components may have the same composition, better characteristics can be obtained by different composition, which may be performed by changing the concentration of the oxide or nitride, for example.

Figure 2A:
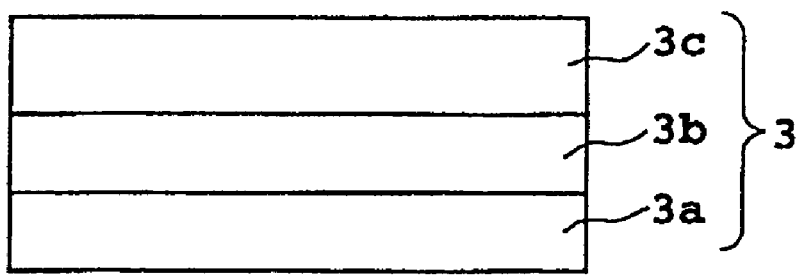
FIG. 2(a) is a schematic cross-sectional view of a magnetic layer of a first magnetic recording medium according to the present invention comprising a plurality of magnetic layer components.

Though the magnetic layer illustrated in FIG. 2(a) is composed of three layers of magnetic layer component, the magnetic layer of the magnetic recording medium of the present invention is only necessary to be formed with two or more layers of magnetic layer components.

Protective film 4 and liquid lubricant layer 5 are sequentially formed on magnetic layer 3. Protective film 4 and liquid lubricant layer 5 may be conventional ones. For example, a thin film mainly composed of carbon may be used for protective film 4 and perfluoropolyether lubricant may be used for liquid lubricant layer 5. Protective film 4 may be laminated by a common method, such as sputtering, and liquid lubricant layer 5 may be formed by a common method, such as coating with a liquid lubricant.

Thus, a first magnetic recording medium of the invention is obtained.

Figure 2B:
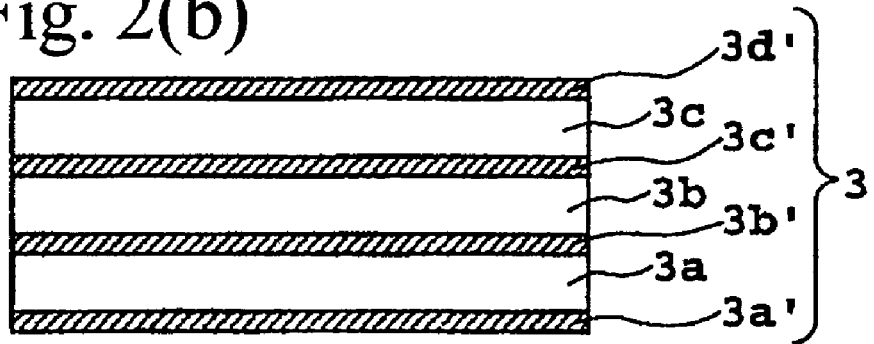
FIG. 2(b) is a schematic cross-sectional view of a magnetic layer of a second magnetic recording medium according to the present invention comprising a plurality of magnetic layer components and a plurality of oxide layers disposed on and beneath each of the magnetic layer components.

The second magnetic recording medium is similar to the first magnetic recording medium described above except that the construction of the magnetic layer is different from the construction of the magnetic layer of the first magnetic recording medium as shown in FIG. 2(b). Magnetic layer 3 formed in the second magnetic recording medium has a structure in which each of magnetic layer components 3a, 3b and 3c is sandwiched by two of oxide layers 3a', 3b', 3c' and 3d' as shown in FIG. 2(b). The magnetic layer components are formed in the same manner as in the first magnetic recording medium. The oxide layers are formed by oxidizing the surface of each of the layer components exposed to an oxygen-containing gas atmosphere. Specifically, a process of exposing the media to an oxygen-containing gas atmosphere, for example, Ar-10% $O_2$ gas, is performed before laminating the magnetic layer component 3a and after laminating each of the magnetic layer components 3a, 3b and 3c.

Materials of the magnetic layer components and thickness of magnetic layer 3 formed in the second magnetic recording medium are the same as those described with respect to magnetic layer 3 of the first magnetic recording medium.

As in magnetic layer 3 of the first magnetic recording medium, better characteristics can be obtained by different composition in the magnetic layer components. These changes may be performed, for example, by changing the concentration of the oxide or nitride, though the same composition is possible.

Though thickness of each of the magnetic layer components and oxide layers is not limited to special range, thickness of magnetic layer 3, that is, the total of the thickness of all magnetic layer components and oxide layers, is preferably nearly equal to the thickness required by the conventional magnetic layer of a continuous film.

Though the magnetic layer illustrated in FIG. 2(b) is formed by alternately laminating three magnetic layer components and four oxide layers, the magnetic layer of the magnetic recording medium of the present invention is only necessary to be constructed with two or more magnetic layer components and three or more oxide layers. The number of oxide layers is larger by one layer than the number of magnetic layer components, wherein the magnetic layer components and the oxide layers are alternately laminated such that the top layer and the bottom layer of magnetic layer 3 are the oxide layers.

Thus, a magnetic recording medium of the present invention is obtained that allows high Hc, low noise and low cost. The following describes effects of multi-layer structure and oxide layer of the magnetic layer that are special features of the magnetic recording medium of the invention.

In usual longitudinal recording, large vertical component of magnetization causes noises as compared with the case in which the magnetization is aligned exactly in the direction of horizontal plane. A thick magnetic layer generally gives rise to vertical alignment of magnetization. Therefore, the magnetic layer of the present invention is multi-layered. When each of the formed films, which are magnetic layer components, is made thin, in-plane orientation of the component film is promoted. Thus, the vertical component of magnetization in the magnetic layer as a whole is decreased, which realizes noise reduction, leading to high Hc.

The granular magnetic layer laminated with a plurality of magnetic layer components in the present invention promotes epitaxial growth of the grain of the ferromagnetic crystal and the grain boundary of oxide in the uppermost magnetic layer component. Moreover, improvement of cystallinity and diminishing grain size of the granular magnetic layer component itself directly under the uppermost magnetic layer component can also be accomplished, resulting in better control of the alignment in the magnetic layer.

As described earlier, it is more favorable to laminate magnetic layer components having different composition by changing the concentration of the oxide or nitride.

More specifically, when the quantity of added oxide or nitride is increased in a granular magnetic film for accelerating grain boundary segregation, fine grain size is attained, which is considered to be necessary for noise reduction. On the other hand, the increased amount of oxide or nitride causes difficulty in the epitaxial growth from the underlayer.

Consequently, the uppermost magnetic layer component of the magnetic layer is given a composition to exhibit excellent magnetic characteristics and electromagnetic conversion characteristics. The lower magnetic layer components, on the other hand, are provided for promoting orderly epitaxial growth of the uppermost magnetic layer component and lattice matching with a layer beneath the magnetic layer, which is an under-layer, for example. Namely, the uppermost component of the granular magnetic layer is formed as a granular film containing increased amount of oxide or nitride to achieve noise reduction, while the lower magnetic layer components are formed as granular films containing less amount of oxide or nitride to accelerate epitaxial growth and containing increased or decreased amount of platinum and chromium. Since increase in platinum or chromium content in a CoCr alloy increases lattice constants, the amount of the elements are appropriately varied, taking into consideration the composition of the uppermost component of the granular magnetic layer and the misfits in the layers formed under the magnetic layer, for example, the under-layer.

Further, lattice matching of misfit is facilitated more readily by the layered structure of the magnetic layer component formed between the layer just beneath the magnetic layer, an under-layer, here, and the uppermost magnetic layer component of the magnetic layer.

Since the material that bears the segregation of the ferromagnetic grain to the grain boundary in the granular magnetic film is an oxide, oxygen quantity profoundly affects promotion of segregation structure. In the second magnetic recording medium of the invention, the oxygen is supplied by the oxide added to the target for the magnetic layer and also by the oxide layers provided on and beneath each magnetic layer component.

In the lamination process of the magnetic layer components of the magnetic layer of the second magnetic recording medium of the invention, each magnetic layer component is exposed to an oxygen-containing atmosphere so as to form oxide layers on and beneath each magnetic layer component. The provision of the oxide layers more effectively supplies oxygen to the granular magnetic film to promote segregation structure. As a result, the interaction between the magnetic grains is suppressed, leading to noise reduction and Hc enhancement.

Consequently, high Hc and low noise is attained even if smaller amount of platinum than conventional is contained, which results in cost reduction.

A magnetic recording medium of the invention having above-described lamination structure allows to achieve high Hc and low media noise even if the manufacturing procedure omits a step for heating the substrate, the heating step being involved in the production of a conventional magnetic recording medium. Accordingly, reduction of manufacturing cost is achieved due to the simplification of the production procedure.

Further, plastic with less cost may be used for the substrate as well as conventional aluminum and glass.

EXAMPLES

The present invention will be described more in detail referring to examples and comparative examples of the magnetic recording medium.

Example 1

A chemically strengthened glass substrate with smooth surface (N-10 glass substrate manufactured by Hoya Corp.) was used for a substrate. After cleaning, the substrate was introduced into a sputtering apparatus. A non-magnetic under-layer 2 having thickness of 15 nm was formed of Cr-20 at % Mo by a dc magnetron sputtering method using a target of Mo-containing Cr alloy under an argon gas pressure of 50 mTorr without heating the substrate.

Then, a granular magnetic layer component 3a having thickness of 10 nm and the same composition as the target was formed by an RF sputtering method using a target of Co-10 at % Cr-14 at % Pt containing 7 mol % of $SiO_2$ under an argon gas pressure of 30 mTorr. Subsequently, another granular magnetic layer component 3b having thickness of 10 nm was formed under the same conditions as in the component 3a. Thus, the double-layered magnetic layer 3 was formed.

On the magnetic layer 3, a carbon protective film 4 of 10 nm thickness was deposited by a sputtering method, and then, the resulted article was taken out from the vacuum of the sputtering apparatus.

A liquid lubricant layer 5 having thickness of 1.5 nm was formed by applying liquid lubricant of perfluoropolyether on the carbon protective film 4.

Thus, a magnetic recording medium as shown in FIG. 1 was produced.

In the above-described laminating process, heating the non-magnetic substrate 1 in advance was not performed.

Concerning magnetic characteristics of the produced magnetic recording medium, the coercive force Hc and the product Br δ of remanent magnetic flux density and film thickness were measured using a vibrating sample magnetometer VSM. Concerning electromagnetic conversion characteristics, regeneration output of solitary regeneration wave TAA, and media noise and SNR (signal-to-noise ratio) at track recording density of 120 kFCI were measured using a GMR head on a spinning stand tester.

Table 1 shows the composition of the laminate structure and Table 2 gives the measured characteristics.

Example 2

A magnetic recording medium as shown in FIG. 1 was produced in the same manner as in Example 1 except that a magnetic layer 3 shown in FIG. 2(a) having total thickness of 20 nm was provided by laminating three magnetic layer components 3a, 3b and 3c, each having thickness of about 6.7 nm.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Example 3

A magnetic recording medium as shown in FIG. 1 was produced in the same manner as in Example 1 except that a magnetic layer 3 having total thickness of 20 nm was provided by laminating four magnetic layer components, each having thickness of 5 nm.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Example 4

A magnetic recording medium as shown in FIG. 1 was produced in the same manner as in Example 2 except that a magnetic layer 3 shown in FIG. 2(b) was formed that comprises oxide layers 3a', 3b', 3c' and 3d' on and beneath each of the magnetic layer components by exposing to Ar-10% $O_2$ gas atmosphere at 10 mTorr for 10 seconds before depositing the magnetic layer component 3a and after depositing each of the magnetic layer components 3a, 3b and 3c.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Comparative Example 1

A magnetic recording medium was produced in the same manner as in Example 1 except that the magnetic layer 3 was composed of a single magnetic layer component having thickness of 20 nm.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Example 5

A magnetic recording medium as shown in FIG. 1 was produced in the same manner as in Example 1 except that a target having composition of Co-10 at % Cr-14 at % Pt added with 12 mol % of SiN was used and granular magnetic layer components 3a and 3b having the same composition as that of the target were formed, for obtaining magnetic layer 3.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Example 6

A magnetic recording medium as shown in FIG. 1 was produced in the same manner as in Example 2 except that the composition of the target for forming the magnetic layer components of the magnetic layer 3 as shown in FIG. 2(a) was Co-10 at % Cr-14 at % Pt added with 12 mol % of SiN.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Example 7

A magnetic recording medium as shown in FIG. 1 was produced in the same manner as in Example 4 except that the composition of the target for forming the magnetic layer components of the magnetic layer 3 as shown in FIG. 2(b) was Co-10 at % Cr-14 at % Pt added with 12 mol % of SiN.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

Comparative Example 2

A magnetic recording medium was produced in the same manner as in Example 5 except that the magnetic layer 3 was composed of a single magnetic layer component having thickness of 20 nm.

The magnetic characteristics and electromagnetic conversion characteristics on the obtained magnetic recording medium were measured in the same manner as in Example 1.

The composition of the laminate structure of this example is shown in Table 1 and the measured characteristics are given in Table 2.

TABLE 1

| | composition | number of magnetic layer | thickness of magnetic layer component (nm) | oxide layer |
|---|---|---|---|---|
| Example 1 | Co—10Cr—14Pt—7SiO$_2$ | 2 | 10 | none |
| Example 2 | Co—10Cr—14Pt—7SiO$_2$ | 3 | 6.7 | none |
| Example 3 | Co—10Cr—14Pt—7SiO$_2$ | 4 | 5 | none |
| Example 4 | Co—10Cr—14Pt—7SiO$_2$ | 3 | 7 | provided |
| Comp Example 1 | Co—10Cr—14Pt—7SiO$_2$ | 1 | 20 | none |
| Example 5 | Co—10Cr—14Pt—12SiN | 2 | 10 | none |
| Example 6 | Co—10Cr—14Pt—12SiN | 3 | 6.7 | none |
| Example 7 | Co—10Cr—14Pt—12SiN | 3 | 7.1 | provided |
| Comp Example 2 | Co—10Cr—14Pt—12SiN | 1 | 20 | none |

TABLE 2

| | Hc (Oe) | Br δ (Gμm) | regeneration output (mVp-p) | media noise (μV) | SNR (dB) |
|---|---|---|---|---|---|
| Example 1 | 3,142 | 60 | 0.70 | 24.3 | 22.7 |
| Example 2 | 3,272 | 63 | 0.71 | 22.5 | 22.9 |
| Example 3 | 3,290 | 59 | 0.69 | 22.0 | 23.2 |
| Example 4 | 3,492 | 60 | 0.67 | 18.9 | 23.9 |
| Comp Example 1 | 3,088 | 59 | 0.71 | 29.2 | 21.7 |
| Example 5 | 2,982 | 61 | 0.70 | 26.4 | 22.2 |
| Example 6 | 3,146 | 59 | 0.69 | 24.1 | 22.5 |
| Example 7 | 3,331 | 60 | 0.70 | 20.2 | 23.3 |
| Comp Example 2 | 2,765 | 62 | 0.72 | 31.4 | 21.2 |

Figure 3:
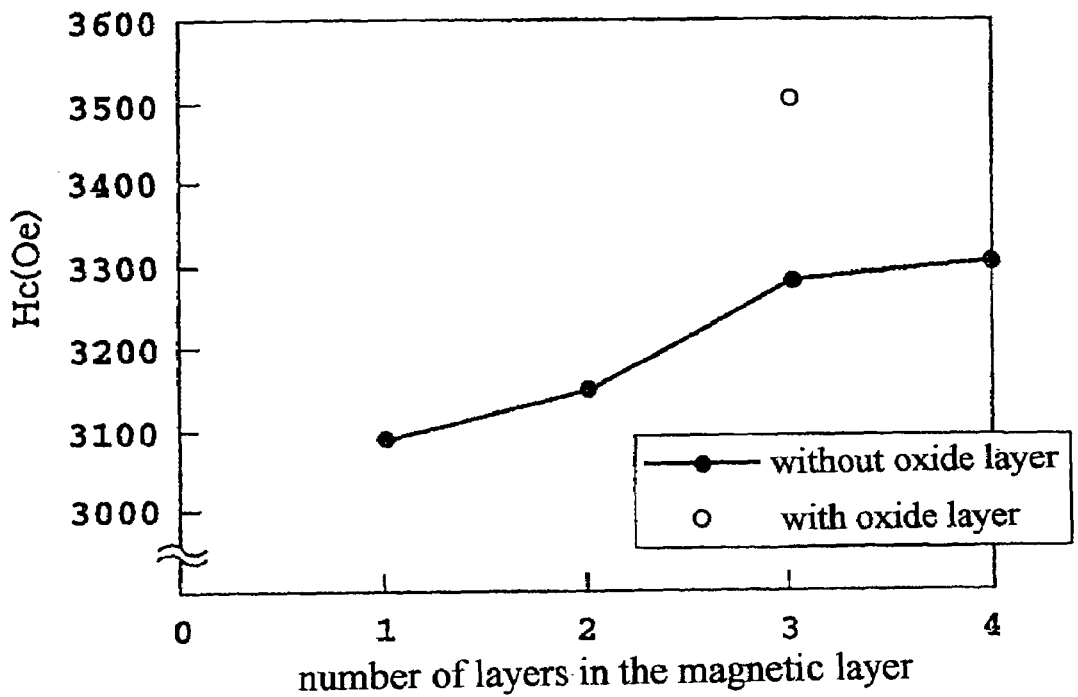
FIG. 3 is a graph showing the dependence of coercive force Hc on the number of magnetic layer components of the magnetic layer.
Figure 4:
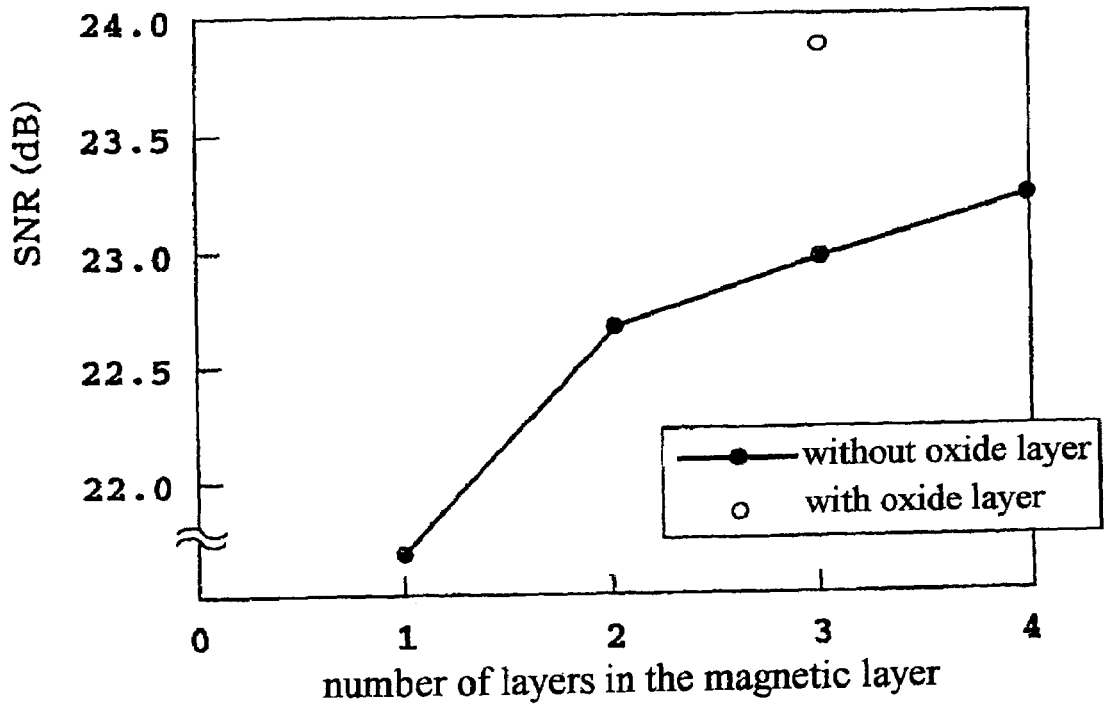
FIG. 4 is a graph showing the dependence of SNR on the number of magnetic layer components of the magnetic layer.

FIG. 3 shows coercive force Hc of each of the magnetic recording media of Examples 1 through 4 and Comparative Example 1. FIG. 4 shows SNR (signal-to-noise ratio) of each of the magnetic recording media of Examples 1 through 4 and Comparative Example 1. The dependence of Hc and SNR on the number of magnetic layer components was studied.

FIGS. 3 and 4, along with Table 2, show that the coercive force Hc and the SNR increase with the increase of the number of the magnetic layer components.

The Hc has been enhanced by more than 50 Oe and over 400 Oe at maximum, and the SNR has been improved by more than 1.0 dB and by 2.2 dB at maximum in the magnetic recording media having magnetic layer 3 that is laminated with two or more magnetic layer components as in Examples 1 through 4 in comparison with the magnetic recording medium having magnetic layer 3 that is composed of a single magnetic layer component as in Comparative Example 1.

The coercive force Hc and the SNR has been further improved in the magnetic recording medium of Example 4 in which the processes of exposing to Ar-10% O$_2$ gas were added before and after depositing each of the magnetic layer components in comparison with Example 2 that did not experience the process. As described earlier, the improvement resulted from further promotion of segregation structure of the magnetic layer caused by effective oxygen supply to the granular magnetic layer from the oxide layers formed. Owing to this effect, the coercive force Hc has been improved by more than 200 Oe and the SNR by 1.0 dB, in the magnetic recording medium having the oxide layers in comparison with the one without oxide layer.

When a multi-layer structure is taken in the magnetic layer, thickness of each magnetic layer component becomes thinner. In general, when film thickness of a magnetic layer is thicker, magnetization tends to more vertically orient. Taking multi-layer structure with total film thickness unchanged in the present invention means lamination of a plurality of thin magnetic layer components. Consequently, in-plane orientation of magnetization is enhanced, resulting in improvement of various characteristics.

Moreover, in the cases of examples 5 through 7 and Comparative Example 2 where nitride SiN was used in place of oxide SiO$_2$ as the material for forming the non-magnetic grain boundary of the magnetic layer, similar results were obtained.

Example 8

A polyolefin substrate with smooth surface was used for a substrate. After cleaning, the substrate was introduced into a sputtering apparatus. A non-magnetic under-layer 2 having thickness of 15 nm was formed of Cr-20 at % Mo by a dc magnetron sputtering method using a target of Mo-containing Cr alloy under an argon gas pressure of 50 mTorr without heating the substrate.

Then, a granular magnetic layer component 3a having thickness of 10 nm and the same composition as the target was formed by an RF sputtering method using a target of 71 at % Co-10 at % Cr-14 at % Pt containing 7 mol % of SiO$_2$ under an argon gas pressure of 30 mTorr. Subsequently, another granular magnetic layer component 3b having thickness of 10 nm and the same composition as the target was formed by using a target of 66 at % Co-10 at % Cr-14 at % Pt containing 10 mol % of SiO$_2$ under the same conditions as in the component 3a. Thus, the double-layered magnetic layer 3 was formed.

A carbon protective film 4 of 10 nm thickness was deposited on magnetic layer 3 by a sputtering method. Then, the resulted article was taken out from the vacuum of the sputtering apparatus.

A liquid lubricant layer 5, having thickness of 1.5 nm, was formed by applying liquid lubricant of perfluoropolyether on carbon protective film 4.

Thus, a magnetic recording medium as shown in FIG. 1 was produced.

In the above-described laminating process, heating non-magnetic substrate 1 in advance was not performed.

Table 3 shows the composition of each of the magnetic layer components and the number of the magnetic layer components of the magnetic layer.

In this example, the chromium alloy under-layer having a body centered cubic lattice is accomplished an excellent (200) orientation and the granular magnetic layer is aimed at the epitaxial growth in which the axis of easy magnetization aligns in (110) orientation of a hexagonal closest-packed structure.

Effects in this Example are represented by an intensity ratio of X-ray diffraction peaks and a half-width obtained by rocking curve measurement that expresses dispersion of orientation at the (110) peak of the uppermost component of the granular magnetic layer 3b. The magnitude of the half-width reflects the extent of epitaxial growth. Large intensity ratio of the X-ray diffraction peaks indicates excellent crystallinity and small half-width of the rocking curve shows orderly epitaxial growth.

The intensity ratio of the X-ray diffraction peaks and the half-width of the rocking curve were measured on the produced magnetic recording medium. The results are given in Table 4. The intensity ratio of the X-ray diffraction peaks was measured by means of powder X-ray diffractometry, that is θ-2θ method, on an X-ray diffractometer. The half-width of the rocking curve was measured with an X-ray profile obtained by moving the detector represented by 2θ, while fixing the sample holder represented by θ.

Concerning magnetic characteristics of the produced magnetic recording medium, the coercive force Hc and the product Br δ of remanent magnetic flux density and film thickness in the horizontal direction and the vertical direction were measured using a vibrating sample magnetometer VSM. Concerning electromagnetic conversion characteristics, regeneration output of solitary regeneration wave TAA, and media noise and SNR (signal-to-noise ratio) at track recording density of 120 kFCI were measured using a GMR head on a spinning stand tester. The measured results are given in Table 5.

Example 9

A magnetic recording medium as shown in FIG. 1 was produced in the same manner as in Example 8 except that a magnetic layer with three layer structure was formed by depositing a magnetic layer component 3a having thickness of 7 nm and the same composition as the target using a target of 75 at % Co-10 at % Cr-10 at % Pt containing 5 mol % of $SiO_2$, depositing a magnetic layer component 3b having thickness of 7 nm and the same composition as the target using a target of 71 at % Co-10 at % Cr-12 at % Pt containing 7 mol % of $SiO_2$, and depositing a magnetic layer component 3c having thickness of 7 nm and the same composition as the target using a target of 66 at % Co-10 at % Cr-14 at % Pt containing 10 mol % of $SiO_2$.

In this example, like in Example 8, the chromium alloy under-layer, having a body centered cubic lattice, has accomplished an excellent (200) orientation. The granular magnetic layer is aimed at the epitaxial growth in which the axis of easy magnetization aligns in (110) orientation of a hexagonal closest-packed structure.

As in Example 8, the intensity ratio of the X-ray diffraction peaks and the half-width of the rocking curve were measured on the produced magnetic recording medium. The results are given in Table 4. The coercive force Hc in the horizontal and vertical directions, the product Br δ of remanent magnetic flux density and film thickness, and SNR were measured as in Example 8. The results are given in Table 5.

Comparative Example 3

A magnetic recording medium was produced in the same manner as in Example 8 except that the magnetic layer consisting of a single layer having thickness of 20 nm and the same composition as that of the target was formed using the target having composition of 66 at % Co-10 at % Cr-14 at % Pt containing 10 mol % of $SiO_2$.

As in Example 8, the intensity ratio of the X-ray diffraction peaks and the half-width of the rocking curve were measured on the produced magnetic recording medium. The results are given in Table 4. The coercive force Hc in the horizontal and vertical directions, the product Br δ of remanent magnetic flux density and film thickness, and SNR were measured as in Example 8. The results are given in Table 5.

TABLE 3

| | magnetic layer composition | number of layers |
|---|---|---|
| Example 8 | Co—10Cr—12Pt—7$SiO_2$ | 2 |
| | Co—10Cr—14Pt—10$SiO_2$ | |
| Example 9 | Co—10Cr—10Pt—5$SiO_2$ | 3 |
| | Co—10Cr—12Pt—7$SiO_2$ | |
| | Co—10Cr—14Pt—10$SiO_2$ | |
| Comparative Example 3 | Co—10Cr—14Pt—10$SiO_2$ | 1 |

TABLE 4

| | peak intensity ratio I(110)/I(101) | rocking curve half-width (deg) | comment |
|---|---|---|---|
| Example 8 | 2–3 | 12 | (110) preferential orientation: incomplete epitaxy |
| Example 9 | >10 | 4 | strong (110) orientation: excellent epitaxy |
| Comparative Example 3 | 1 | 30 | random orientation: not epitaxial |

TABLE 5

| | horizontal | | vertical | | |
|---|---|---|---|---|---|
| | Hc (Oe) | Brf Å (Gμm) | Hc (Oe) | Br δ (Gμm) | SNR (dB) |
| Example 8 | 3,198 | 61 | 989 | 11 | 22.7 |
| Example 9 | 3,387 | 60 | 53 | 4 | 23.7 |
| Comparative Example | 3,042 | 59 | 2790 | 25 | 21.6 |

It can be understood from Table 4 that the alignment in the magnetic layer of Comparative Example 3, which has a granular magnetic layer of a single layer, is random alignment that does not exhibit any preferential orientation. The large half-width of the rocking curve implies that epitaxial growth in the (200) direction of the chromium alloy under-layer did not develop.

In longitudinal recording, c-axis of the magnetic layer having hexagonal closest-packed structure is desired to align with in-plane orientation. In general, when alignment of the under-layer chromium alloy having a body centered cubic lattice exhibits preferred orientation in (200) plane, the in-plane orientation in which the axis of easy magnetization of the magnetic layer is hcp (110) plane, grows epitaxially.

In the double-layered granular magnetic layer of Example 8, the lower magnetic layer component has a composition in which grain size is smaller and misfit is also smaller than those of the upper magnetic layer component. Consequently, lattice matching with upper and lower interfaces is improved with the aid of the lower magnetic layer component. The orientation of the upper magnetic layer component became such that the axis of easy magnetization of Co is hcp (110) preferential orientation. Besides, the half-width of the rocking curve indicates development of much more improved epitaxial growth than in Comparative Example 3.

In Example 9, one more magnetic layer component that has composition with small grain size and little misfit, was deposited as compared with Example 8. Because the Example 9 allows to more precisely control promotion of the lattice matching, the axis of easy magnetization in the uppermost magnetic layer component strongly aligns in hcp (110) orientation. Moreover, the half-width of the rocking curve obtained was very small, which shows a remarkable effect of the multi-layer structure.

As can be seen from Table 4 and Table 5, alignment of the magnetic layer is not controlled in Comparative Example 3 and the Co-c-axis orientation is in random orientation. Consequently, the coercive force in vertical direction is large and the grain boundary segregation structure is insufficient, which results large media noise and deteriorated SNR.

In contrast, Examples 8 and 9, in which epitaxial growth from the under-layer progressed to a considerable extent, exhibited a very small value of the coercive force in vertical direction. This also reveals an effect of multi-layer structure of the magnetic layer. The results are reduction of media noise due to promotion of the segregation structure and enhancement of SNR due to reduction of the noise caused by the vertical component of magnetization.

Effect of the Invention

By laminating a plurality of magnetic layer components each having granular structure, alignment of the magnetic layer is possible to be controlled. The resulting magnetic layer exhibits excellent crystallinity with little dispersion of orientation. As a result, higher Hc and lower noise are achieved more favorably than in a magnetic recording medium having a continuously deposited magnetic layer, in comparison with a conventional granular magnetic layer consisting of a single continuous layer. In addition, since high Hc is easily attained thanks to the effect of the invention even if the amount of platinum in the target for the magnetic layer is decreased, low noise can be attained with less amount of platinum, which means possibility of cost reduction.

The above-described effect produced by the multi-layer structure of the magnetic layer is enhanced when the non-magnetic non-metallic substance used in the granular magnetic layer is oxide(s) of at least one element selected from the group consisting of Cr, Co, Si, Al, Ti, Ta, Hf and Zr, when a CoPt alloy containing at least an element selected from the group consisting of Cr, Ni and Ta is used for the ferromagnetic crystal in the granular magnetic layer, or when chromium or chromium alloy is used for the non-magnetic under-layer.

By employing the multi-layer structure in the magnetic layer, even if heating of the substrate is omitted in laminating a medium of the invention, the media noise due to the magnetic grain size and the grain boundary segregation and the noise due to vertical component of magnetization are reduced, and high Hc is readily achieved. Accordingly, plastics with low cost may be used for the substrate in addition to conventional aluminum and glass substrate.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a magnetic recording medium comprising the steps of:
   laminating a non-magnetic under-layer on a non-magnetic substrate;
   laminating a magnetic layer on said under-layer by the steps of:
      exposing said non-magnetic underlayer to an atmosphere of oxygen-containing gas to form an oxide layer on a surface of said non-magnetic underlayer;
      depositing, on an oxide layer, a magnetic layer component comprising ferromagnetic grains and grain boundaries surrounding said grains;
      exposing said magnetic layer to said atmosphere of oxygen-containing gas and forming an oxide layer on a surface of said magnetic layer; and
      repeating the depositing and the exposing said magnetic layer steps at predetermined times,
   laminating a protective film on said magnetic layer; and
   laminating a liquid lubricant layer on said protective film.

2. The method for manufacturing a magnetic recording medium according to claim 1, wherein each step is performed without heating said substrate in advance.

3. A method for manufacturing a magnetic recording medium comprising the steps of:
   laminating a non-magnetic under-layer on a non-magnetic substrate;
   exposing the non-magnetic under-layer to an atmosphere of oxygen-containing gas;
   forming an oxide layer on said non-magnetic under-layer;
   laminating a magnetic layer on said under-layer comprising the steps of:
      depositing, on a surface of the preceding oxide layer, a magnetic layer component comprising ferromagnetic grains and grain boundaries surrounding said grains;
      after depositing a preceding magnetic layer, exposing the preceding magnetic layer surface to the atmosphere of oxygen-containing gas;
      forming an oxide layer on the preceding magnetic layer surface; and
      repeating the depositing, exposing, and forming steps a predetermined number of times;
   laminating a protective film on said magnetic layer; and
   laminating a liquid lubricant layer on said protective film.

* * * * *